UNITED STATES PATENT OFFICE.

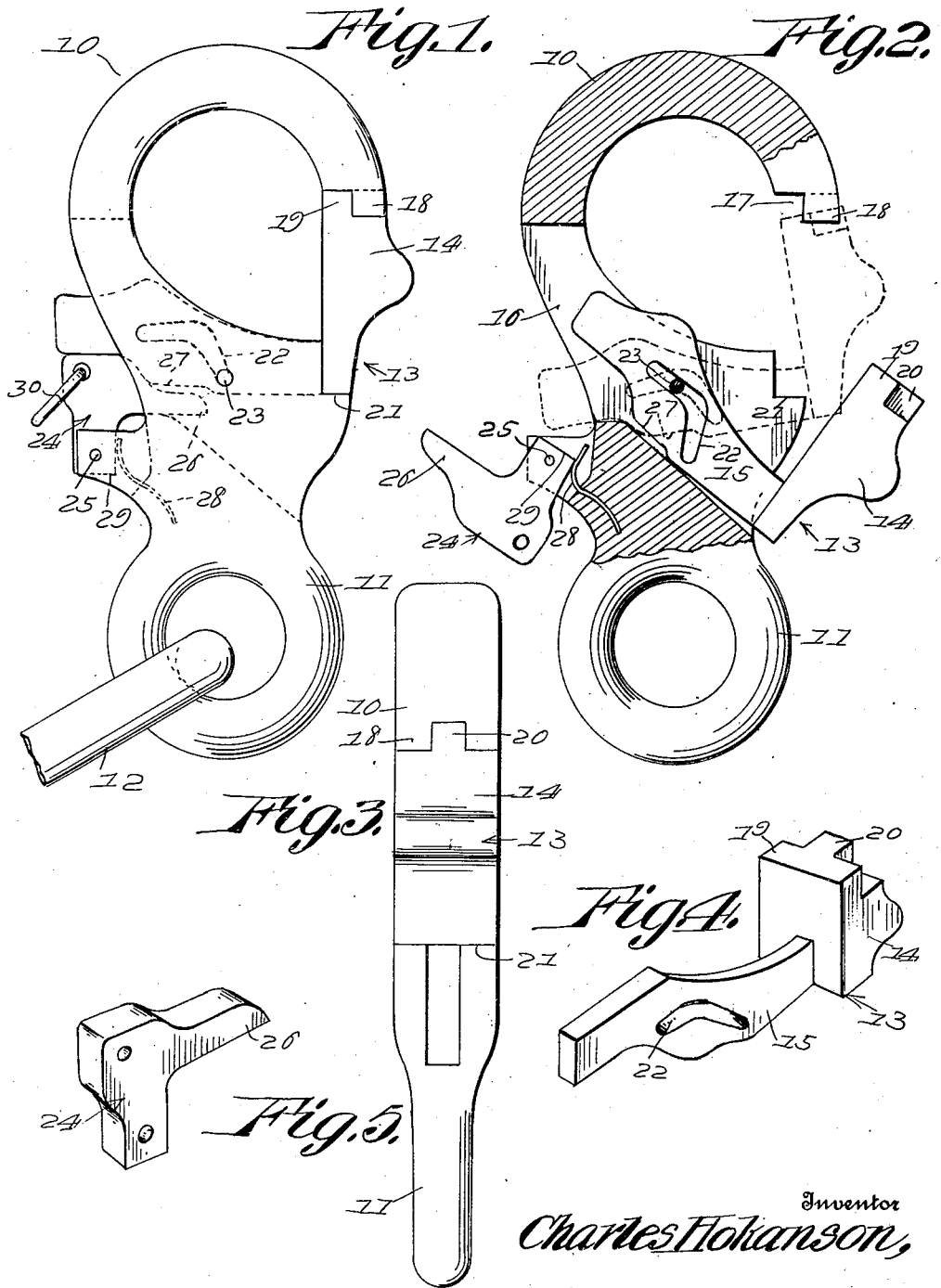

CHARLES HOKANSON, OF CROOKSTON, MINNESOTA, ASSIGNOR OF ONE-THIRD TO EMANUEL HOKANSON AND ONE-THIRD TO EMMA KOEPPE, BOTH OF CROOKSTON, MINNESOTA.

SAFETY OR LOCK HOOK.

1,363,873.     Specification of Letters Patent.     Patented Dec. 28, 1920.

Application filed May 24, 1919. Serial No. 299,487.

*To all whom it may concern:*

Be it known that I, CHARLES HOKANSON, a citizen of the United States of America, residing at Crookston, in the county of Polk and State of Minnesota, have invented new and useful Improvements in Safety or Lock Hooks, of which the following is a specification.

The object of the invention is to provide a hook adapted for use as a shackle or in connection with fall blocks and the like wherein the throat may be efficiently closed to prevent accidental disengagement from a ring, cable or other object with which it may be engaged while permitting the opening of the same with facility when required, the parts being so related as to minimize the strain upon the closing elements due to the vibration or movement of the engaged ring, and to this end the same consists in a construction, combination and relation of parts of which a preferred embodiment is illustrated in the accompanying drawings, it being understood that changes in form, proportion and details may be resorted to, within the scope of the claims without departing from the principles involved.

In the drawings:

Figure 1 is a side view of a hook embodying the invention.

Fig. 2 is a sectional view of the same with the parts shown in full lines in their open position and with the retainer shown in dotted lines in an intermediate position.

Fig. 3 is a face view of the same.

Fig. 4 is a detail view in perspective of the retainer.

Fig. 5 is a similar view of the dog.

The hook 10 which may be provided with the usual eye 11 for engagement with a ring 12 or its equivalent, carries a retainer 13 comprising a head 14 adapted to fit and close the throat of the hook as shown in Fig. 1 and a shank 15 which operates in a slot 16 in the neck of the hook. The bill of the hook is provided with an inner recess 17 and a bifurcated extremity 18, while the head of the retainer is provided with a transverse tongue 19 for reception by said recess 17 and a web 20 to fit between the elements of the bifurcation 18 of the bill, so that when the retainer is in its closing position with relation to the bill of the hook there is an interlocking disposition of the parts which necessitates a tilting movement of the retainer in order to open the throat of the hook. To still further reinforce the retainer when in its throat-closing position the head 14 thereof is adapted at its lower end for reception by a seat 21 formed at the base of the throat in the body portion of the hook, and thus after the interlocking engagement of the upper end of the head with the bill of the hook the swinging movement of the retainer from the position indicated in dotted lines in Fig. 2 to that indicated by the full lines in Fig. 1 will cause the engagement of the lower end of the retainer head with the shoulders 21 which serve to brace the head in the closing position and guard against displacement of the retainer except by first tilting the same to the dotted line position shown in Fig. 2. In other words when the retainer is in its throat-closing position the head thereof is locked in place by its engagement with the hook itself, in that its lower end rests upon the seat formed by the shoulders 21 and is thereby held in interlocked relation at its upper end with the bill of the hook.

In order to permit of this movement of the retainer its shank 15 is provided with an irregular or cam-shaped slot 22 engaging a transverse pin 23, and the first movement of displacing the retainer is to swing the tail or rear portion of the shank downward so as to disengage the lower end of the retainer head from the seat 21, after which a bodily swinging movement of the retainer on the pin 23 as a center and a subsequent sliding movement of the shank upon the pin will displace the head of the retainer entirely out of the path of an object passing through the throat, or in other words will remove the original head from the position in obstruction of the throat of the hook.

To maintain the retainer in its operative position after the head thereof has been interlocked with the bill of the hook and has been seated upon the shoulder 21, there is employed a pivotal dog 24 mounted as indicated at 25 and having a reduced nose 26 which is adapted to be swung under a shoulder 27 of the retainer shank as indicated by the dotted lines in Fig. 1. This dog is yieldingly held in either its locking or disengaged positions by means of a spring 28 engaged with the hub portion 29 of the dog. Also the latter may for convenience in operation be provided with a finger hold or ring 30.

Thus when the retainer is in its throat-closing or operative position, in order to open the hook it is necessary first to disengage the dog by swinging it from the position indicated in Fig. 1 to that shown in Fig. 2 where it is held by the spring 28, and then to drop the rear end or tail of the shank 15 to the position indicated in dotted lines in Fig. 2 so as to effect the unseating of the lower end of the retainer head from the shoulder 21. The retainer is then free to swing downward and forward to the full line position indicated in Fig. 2 to remove it from the throat of the hook and permit of the engagement or disengagement of the latter as the conditions may require.

When the retainer is in its normal or throat-closing position and is properly locked, the dog simply serves as a means of preventing the initial tilting movement of the shank which is necessary to effect the disengagement of the lower end of the head 14 from the shoulder 21. Any strain upon the retainer caused by the ring or other object with which the hook may be engaged is sustained by the interlocking engagement at the bill of the hook and the shoulder upon which the retainer head is seated, and obviously these elements of the structure may be made as substantial as required to suit the conditions under which the hook is intended to be used. Any strain incident to the movement of the object with which the hook is engaged is not brought to bear upon the shank of the retainer nor upon the dog by which the retainer is held in its normal position to prevent the necessary tilting of the retainer head.

Claimed:

1. A lock hook having a slotted neck portion, a retainer having a throat closing head and a shank disposed in the slot of said neck, the said shank having a cam slot, a transverse pin passing through the neck portion and crossing the slot therein and passing through the cam slot, the retainer head having an interlocking engagement with the hook bill and the hook being formed with a seat opposite the bill for the reception of the retainer head, and a dog pivotally mounted on the neck portion of the hook and adapted for movement into and out of engagement with the retainer shank at a point opposite the head whereby movement of the shank is precluded when the head is in engagement with the bill and seat respectively, the shank portion, when the retainer is disengaged therefrom being movable through the instrumentality of the cam slot to permit the disengagement of the head from the seat and bill of the hook.

2. A lock hook having a slotted neck portion, a retainer having a throat closing head and a shank disposed in the slot of said neck, the said shank having a cam slot, a transverse pin passing through the neck portion and crossing the slot therein and passing through the cam slot, the retainer head having an interlocking engagement with the hook bill and the hook being formed with a seat opposite the bill for the reception of the retainer head, and a dog pivotally mounted on the neck portion of the hook and having a retaining spring bearing thereon, the nose of the dog being reduced for entrance into the slot of the neck portion for engagement with the shank of the retainer whereby movement of the latter is precluded when the retainer head is in engagement with the hook bill and the seat, the dog being disengageable from the shank to permit movement of the latter through the instrumentality of the cam slot to disengage the head from the hook bill and seat.

In testimony whereof I affix my signature.

CHARLES HOKANSON.